S. S. & J. G. Sherman.
Harvester-Rake.
N° 85139. Patented Dec. 22, 1868
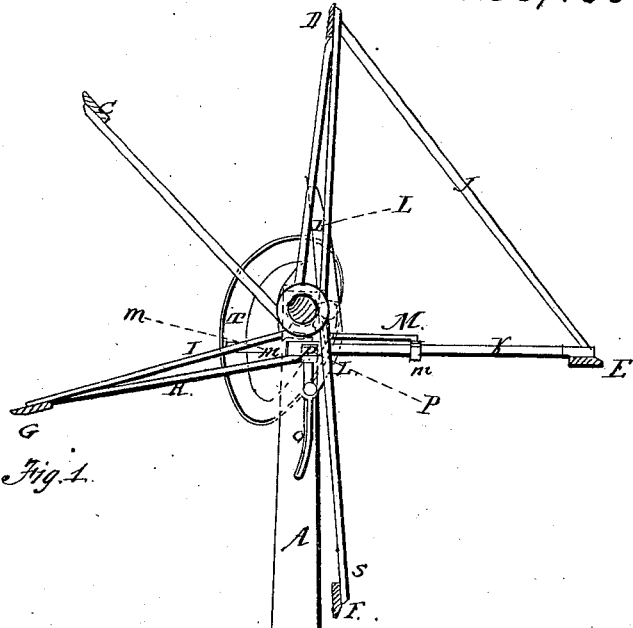
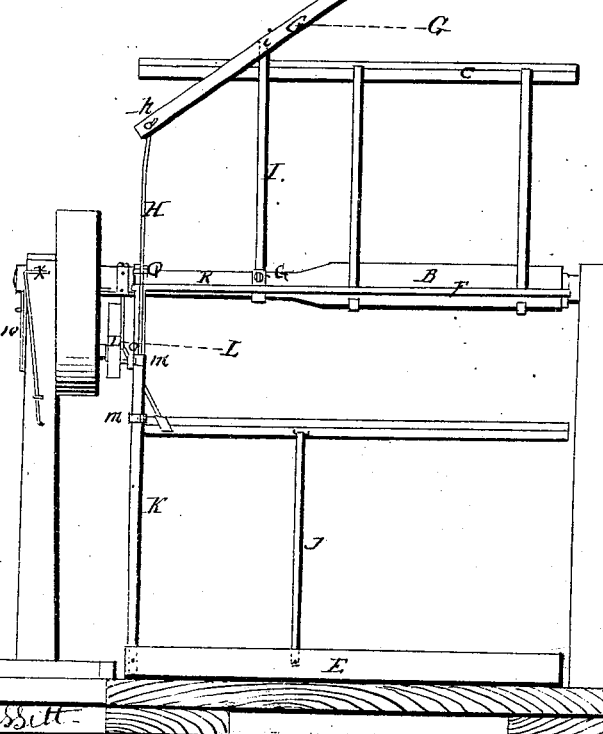
Witnesses:
Stephen Fassett
H. Bruns.
Inventor:
S. S. Sherman
J. G. Sherman
by Coburn Mann Sheet 2 — 2 Sheets
S. S. & J. G. Sherman.
Harvester-Rake.
Nº 85,139. Patented Dec. 22, 1868.
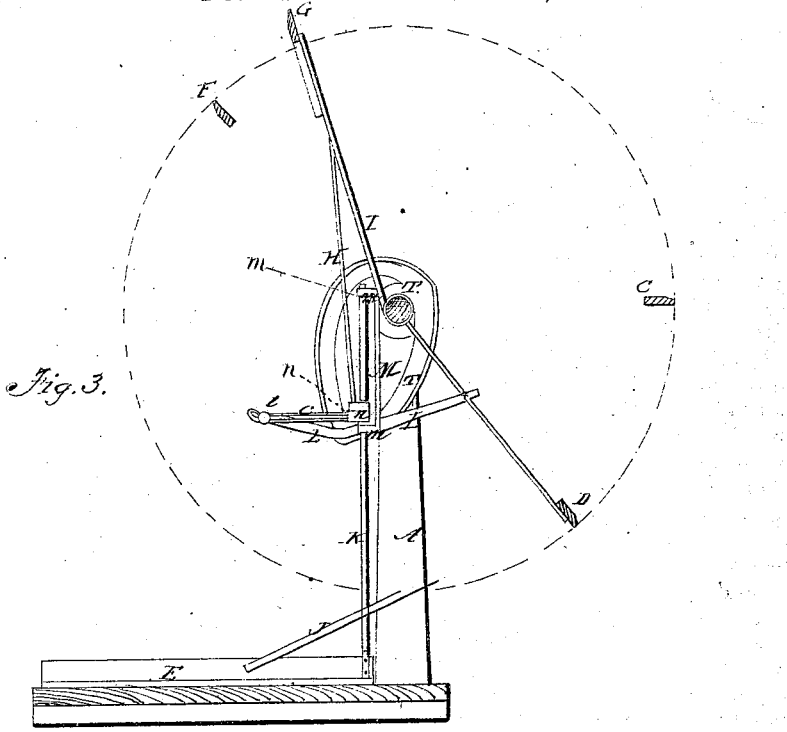
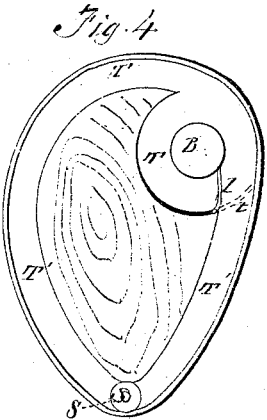
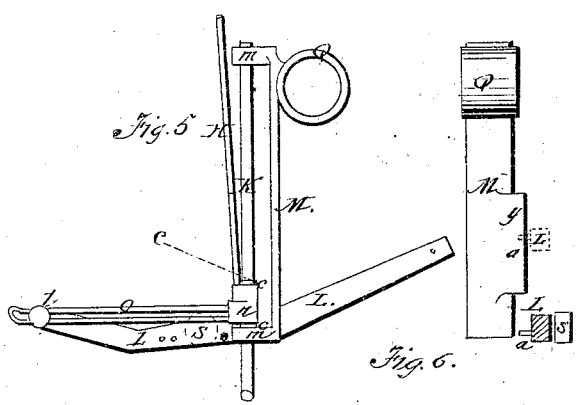
Witnesses:
Stephen Fassett
H. Bruns
Inventors:
S. S. Sherman
J. G. Sherman
by Coburn Mans

UNITED STATES PATENT OFFICE.

SAMUEL S. SHERMAN AND JEREMIAH G. SHERMAN, OF McHENRY, ILLINOIS.

IMPROVEMENT IN HARVESTER-RAKES.

Specification forming part of Letters Patent No. 85,139, dated December 22, 1868.

*To all whom it may concern:*

Be it known that we, SAMUEL S. SHERMAN and JEREMIAH G. SHERMAN, of McHenry, in the county of McHenry and State of Illinois, have invented a new and useful Improvement in Harvester-Reels; and we do hereby declare and make known that the following is a full, clear, and exact description of the same, reference being had to the accompanying drawings, and the letters and figures marked thereon, which form part of this specification.

Our said invention consists in so constructing a harvester-reel that one or more of its arms or beaters may, by means of suitable mechanism, be made to operate in such a manner and with such movements, when desired, as to push the grain off from the platform upon which it falls, when cut in gavels, ready to be bound in bundles, as desired, thus dispensing entirely with the necessity of using rakes upon harvesting-machines, as hereinafter more fully described.

To enable those skilled in the art to understand how to construct and use our said improvement, we will proceed to describe the same with particularity, making reference in so doing to the aforesaid drawings, in which—

Figure 1 represents an end elevation of our improved reel. Fig. 2 is a rear view thereof, one of the beaters being in position to commence pushing the grain from the platform. Fig. 3 is a transverse sectional view, one of the beaters being in the position in which it completes the movement whereby the grain is pushed off. Fig. 4 is a detached view of the eccentric-groove, whereby the movable arm or arms of the reel, or the beaters aforesaid, are caused to operate as desired. Fig. 5 is a detached view of the mechanism attached to the reel, through which said eccentric-groove causes the beater to operate as described; and Fig. 6 is a detached view of a guide which operates to control the movable beater in its descent to the platform.

Similar letters of reference in the several figures indicate the same parts of our said invention.

A represents the upright posts, upon which the reel-shaft B is supported in its bearings, the platform being like those in ordinary harvesters, having a side delivery of the gavels, where the rake makes a quadrantal sweep.

The beaters marked C, D, and F have their arms rigidly secured to the shaft B, the beater G having one arm near the middle (marked I) rigidly secured to said shaft B, said beater G being pivoted thereto, so as to be oscillated by means of the arm H at one end thereof, as hereinafter described.

The beater E is the one which is designed to push the grain off from the platform, and is attached at the end of a sliding rod, K, which has a longitudinal and also a semi-rotatory movement in the collars $m$ $m$ upon each end of a bar, M, which bar is secured to a bar, R, which connects two collars, Q Q, upon the reel-shaft, so that said beater E may be moved out from the reel-shaft when desired, for the purpose of allowing said beater E to drop down upon the platform to push off the grain, as hereinafter described.

The arm J, which is connected to the middle of said beater E by a hinge-joint, is connected to the stationary beater D in a similar manner, so that the movement of the beater D will push the beater E around to push the grain off at the side of the platform, the heel of said beater E, which is attached to the sliding and rotating post or rod K, being held stationary thereby, its rotation permitting the opposite end of the beater E to sweep around, as described. Upon said arm or rod K, between the collars $m$ $m$, in which said rod slides and turns, as aforesaid, is another collar, in which said rod K also turns, but which collar (marked $n$) is prevented from any longitudinal movement upon said rod by stationary collars or shoulders, (marked $c$ $c$,) to which collar $n$ an arm, O, is rigidly attached, as shown, said arm O being provided with a longitudinal slot, as and for the purposes hereinafter described.

To the arm of the stationary beater D is pivoted a carrying-lever, (marked L,) the opposite end of said lever being connected to the aforesaid arm O by means of a headed pin, $l$, passing through the slot in said arm and into the said lever; or said attachment may be made in any suitable manner which will permit the point of attachment to traverse the said arm.

Upon said driving-lever, upon that side of the same next to the standard A which supports the reel, is secured a roller, S, which roller is supported upon a spindle of such a length as to cause said roller to lie in the groove T, made or secured upon the standard A, as shown, so that when a cut-off, t, is in the position indicated by the dotted lines in Fig. 4, said roller S, or its equivalent, moves around in the said groove T, which is concentric with the reel-shaft, and keeps the reel-beater E rigid in its position; but when the cut-off t is turned in the position indicated by the full lines in said Fig. 4, said roller S is made to travel around in the eccentric groove T as the reel is revolved, which groove is so shaped as to cause the reel-beater E to operate as desired, and as hereinafter more fully described.

The cut-off t aforesaid may be operated by an arm, w, projecting through the face of the plate of the cams or grooves, to be detained in either position by means of a spring or stop, x, as seen in Fig. 4, or in any other suitable manner, as may be preferred.

The arm H, which is attached to the end of the beater G, as aforesaid, has its opposite end secured to the aforesaid collar n, so that it may serve to assist the restoring of the beater E to its proper distance from the reel-shaft to serve as a reel-beater during the next revolution of the reel, by means of the weight of the beater G, balanced at the point i, as hereinafter set forth; but we do not regard said arm H or balanced beater G as essential, and said beater G may be attached rigidly to the shaft B in the ordinary manner, the arm H connecting directly with the reel-shaft.

When the beater E commences to move out from the center of the reel to drop upon the platform, a lip, y, upon the bar M passes between two pins, a a, upon the lever L, and thus steadies the descent of the said beater, and causes it to descend to the desired position just behind the cutter.

This device, although beneficial, we do not regard as a necessary feature of our invention, and the same will operate successfully without it.

Other means of moving the beater E in the desired manner and at the proper times may also be devised, to be used in place of the grooves T T' and the lever L.

Having described the nature and construction of our said improved reel, we will now describe its operation.

When the cut-off t is in the position shown in Fig. 4 by the dotted lines, the reel revolves uniformly, all its arms and beaters remaining immovable, as desired; but when the cut-off is turned up to the position shown by full lines in said Fig. 4, then the roller S moves down in the eccentric-groove and forces the lever L downward, so that, by means of its attachment to the arm O and collar n, the latter resting on a stationary shoulder, c, as before mentioned, said operation causes the rod K to slide out through its supports m m until the heel of the beater E reaches the platform, and the beater lies just upon the platform parallel to and just behind the cutter-bar, when the shoulder c comes in contact with the collar m upon the lower end of the arm M, as indicated in Fig. 5, the position of the beater E, at this point of its revolution, being represented in Fig. 2.

Inasmuch as the arm H is attached to the collar n, (when said arm is used,) it is obvious that the descent of the collar n or the sliding out of the rod K draws that side of said beater G to which said arm H is attached down near the shaft B, as is shown in said Fig. 2. While the roller S is passing around the lower part of the groove T the arm O extends horizontally backward, so that the forward movement of the beater D, in the revolution of the reel by means of the arm J, pushes the beater E around, over, and upon the platform, as aforesaid, the pin l sliding along the arm O without moving the end of the beater E, to which the rod K is attached, the rotatory movement of which rod permits the aforesaid movement of the beater E, which thus pushes the gavel which it shoved back, as aforesaid, off from the platform, as desired.

When the gavel is thus delivered the roller S commences to move upward in the groove T, and therefore the lever L, operating upon the arm O, raises the rod K up until the heel of the beater E is at the same distance from the shaft B as it formerly was when in its original position, at which point, in its ascent, the upper collar c strikes against the upper bearing m, through which the rod moves and prevents it from sliding farther.

In this operation, as the balancing-beater G is at the top of the reel, as seen in Fig. 2, its end upon the opposite side of the fulcrum weighs down and assists the raising of the beater E, as aforesaid, which device—to wit, the arm H and oscillating beater—may be dispensed with, if desired.

When the collar c strikes against the bearing m, as aforesaid, and prevents the further sliding of the rod K, the continued revolution of the reel, and the direction of the groove T, in which the roller S moves, causes the said collar c to strike forcibly against the bearing m, which is rigidly connected, as aforesaid, to the collars Q upon the reel-shaft, causing said collars Q to revolve forward upon said shaft until the heel of the beater E is brought to its original position between the corresponding ends of the beaters D and F, when it resumes its original parallel position in the reel, as seen in Fig. 1.

It may be observed that the last-described operation—to wit, the revolving of the collars Q upon the reel-shaft—might occur before the operation of sliding the rod K up through the bearings m m, and would so occur in case the power required to raise said beater E from the platform was greater than that required to revolve said collars Q.

Having described the nature, construction, and operation of our improved reel, we will now specify what we claim and desire to secure by Letters Patent:

1. The combination of the beater E, arm J, or its equivalent, and sliding and rotating rod K and its bearings *m m*, arranged and operating substantially in the manner and for the purposes specified.

2. In combination with the movable beater E, rod K, and arm H, the fulcrumed beater G, arranged to operate substantially as and for the purposes set forth.

3. The combination of the collar Q, the arm M, with the bearings *m m*, the rotating rod K, and beater E, arranged and operating substantially as described.

4. The combination of the lever L, or its equivalent, and the arm O, with the rod K, bearings *m m*, and beater E, arranged and operating substantially in the manner and for the purposes set forth.

5. The combination of the lever L with said arm O and the reel, when said lever is provided with a roller, S, or its equivalent, moving in a groove or grooves, T T', substantially as and for the purposes described.

6. The combination of the lever L, pins *a a*, and flange *y* upon the bar M, operating in the manner herein specified.

SAMUEL S. SHERMAN.
JEREMIAH G. SHERMAN.

Attest:
E. M. OWEN,
L. D. BLACKMAN.